(12) United States Patent
Radhakrishnabhat et al.

(10) Patent No.: US 12,381,705 B2
(45) Date of Patent: Aug. 5, 2025

(54) FAST MULTICAST CONVERGENCE FOR TIME SYNCHRONIZATION IN A NETWORK

(71) Applicant: Hewlett Packard Enterprise Development LP, Spring, TX (US)

(72) Inventors: Chethan Chavadibagilu Radhakrishnabhat, Bangalore (IN); Venkatavaradhan Devarajan, Bangalore (IN); Tathagata Nandy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 429 days.

(21) Appl. No.: 18/093,253

(22) Filed: Jan. 4, 2023

(65) Prior Publication Data

US 2024/0223348 A1 Jul. 4, 2024

(51) Int. Cl.
*H04L 7/00* (2006.01)
*H04L 45/16* (2022.01)

(52) U.S. Cl.
CPC ............ *H04L 7/0012* (2013.01); *H04L 45/16* (2013.01)

(58) Field of Classification Search
CPC .............................. H04L 7/0012; H04L 45/16
See application file for complete search history.

(56) References Cited

U.S. PATENT DOCUMENTS

| | | | |
|---|---|---|---|
| 2015/0318941 A1* | 11/2015 | Zheng | H04J 3/0697 370/503 |
| 2021/0400610 A1* | 12/2021 | Aijaz | H04L 7/0012 |
| 2023/0065686 A1* | 3/2023 | Umasuthan | H04L 7/0008 |

FOREIGN PATENT DOCUMENTS

| | | | |
|---|---|---|---|
| CN | 103532231 B | * 5/2015 | |
| EP | 2782290 A1 | * 9/2014 | ............ H04J 3/0641 |
| WO | WO-2017130034 A1 | * 8/2017 | |

OTHER PUBLICATIONS

Eidson, J. C., et al., "IEEE Standard for a Precision Clock Synchronization Protocol for Networked Measurement and Control Systems", IEEE-1588™ Jul. 24, 2008, pp. 13.
RFC 4601—Protocol Independent Multicast—Sparse Mode (PIM-SM): Protocol Specification (Revised).

* cited by examiner

*Primary Examiner* — Kenny S Lin
(74) *Attorney, Agent, or Firm* — Yao Legal Services, Inc.

(57) ABSTRACT

A system for providing fast multicast convergence for Precision Time Protocol (PTP) at a switch is provided. During operation, the system can receive a multicast control message based on a multicast protocol used for PTP from a respective neighbor switch. The multicast control message can indicate neighbor information associated with the multicast protocol. The system can then determine a role associated with the PTP for a remote switch from the control message. Upon receiving a register message for a multicast group associated with the PTP, the system can determine whether a multicast path from the switch to a PTP source includes a device with a role of a boundary clock (BC) of PTP. If the multicast path includes a device with a role of a BC, the system can send a gratuitous register-stop message for the multicast group toward the PTP source in absence of a native path.

20 Claims, 7 Drawing Sheets

FAST MULTICAST CONVERGENCE FOR TIME SYNCHRONIZATION IN A NETWORK

BACKGROUND

Field

The present disclosure relates to communication networks. More specifically, the present disclosure relates to a method and system for providing fast convergence to a multicast protocol facilitating time synchronization in a network.

BRIEF DESCRIPTION OF THE FIGURES

In the figures, like reference numerals refer to the same figure elements.

DETAILED DESCRIPTION

Figure 1:
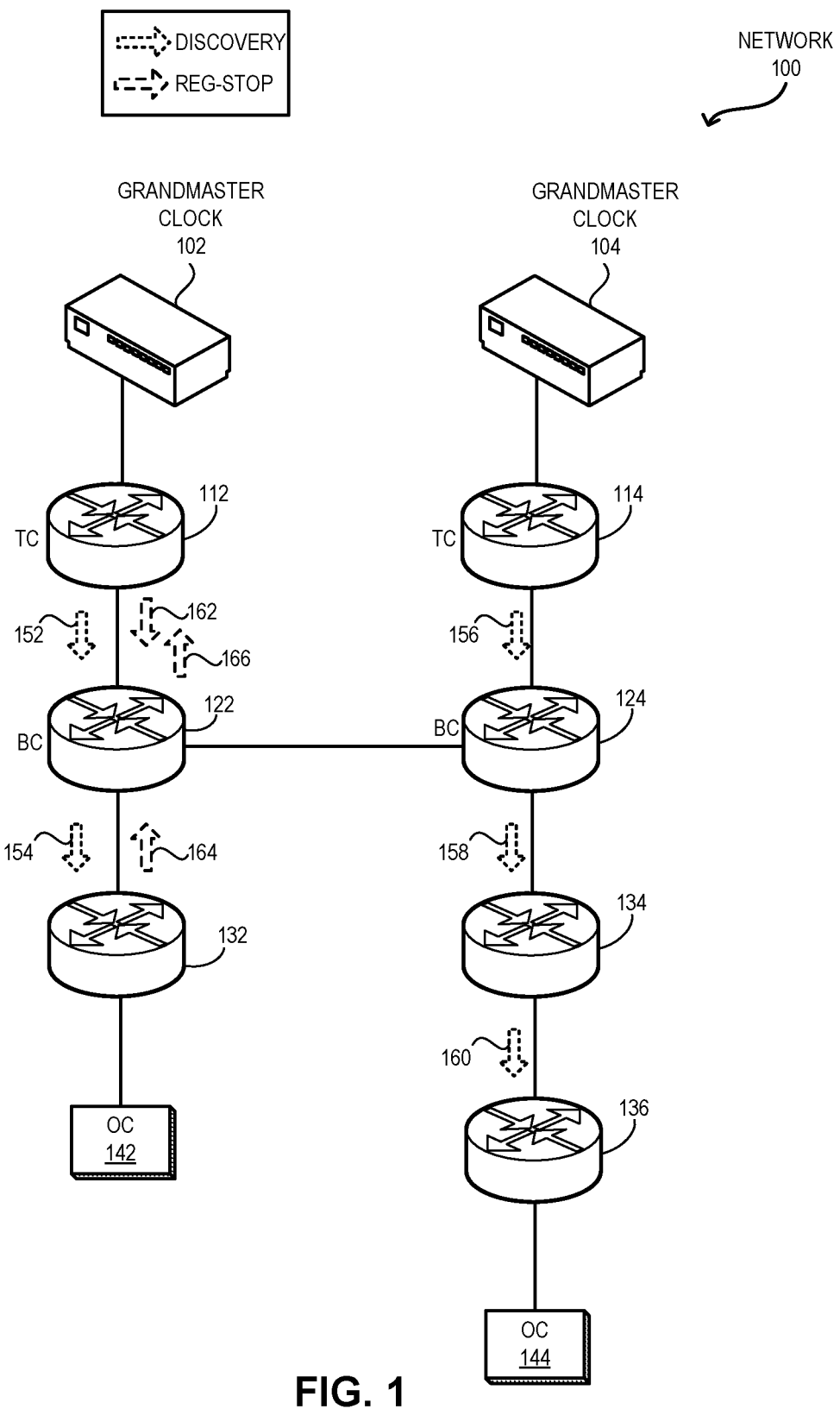
FIG. 1 illustrates an example of a network that provides fast convergence to a multicast protocol facilitating time synchronization, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities. Some of the capabilities may require clock synchronization among the switches in a network. A synchronization protocol, such as Precision Time Protocol (PTP), can be used to synchronize the respective clocks of the switches in a network. If PTP is enabled in a network, it can deploy a grandmaster clock (GMC), which can provide a time reference in the network.

Typically, the GMC can be a network appliance and may obtain time information (e.g., Universal Time Coordinated (UTC) time information) from an external source, such as a satellite source. The GMC can use a multicast protocol, such as Protocol-Independent Multicast (PIM), to provide the PTP stream and relies on the multicast infrastructure in the network (e.g., the multicast daemons on the switches) to forward the multicast packets of the PTP streams. For example, the PTP protocol can rely on the Rendezvous Point (RP) and designated routers (RPs) to efficiently forward the PTP stream. PTP allows a switch to be configured with different clock types, such as a Transparent Clock (TC) and a Boundary Clock (BC).

A switch configured as a TC can be referred to as a TC switch and may not operate as a source or sink for a clock (e.g., the GMC). A TC switch can modify a correction field in a PTP event message. The TC switch can decrease the switch latency and jitter. In this way, the TC switch can appear transparent to ordinary clocks while reducing the time errors for a PTP client and improving synchronization quality. On the other hand, a switch configured as a BC can be referred to as a BC switch and can operate as an intermediate device between the GMC and a PTP client. Unlike a regular multicast stream, a PTP stream generated by the GMC can be terminated at the BC switch. The BC switch can then synchronize the local clock and initiate another PTP stream as a clock source toward the downstream clock-aware devices. The BC switch, thus, can provide scalability to the PTP deployment in the network. However, since a BC switch can operate as a sink and a source, which is distinct from typical multicast forwarding, converging the multicast protocol for a PTP deployment in a network can be challenging.

The aspects described herein solve the problem of ensuring convergence of the multicast protocol for PTP, independent of the deployment of an RP and DRs, by (i) providing the PTP role of a switch (e.g., a TC or BC switch) to the neighbor switches using a multicast discovery message; and (ii) sending a gratuitous register-stop message to a DR from the RP based on the PTP capabilities of the switches on the upstream path. In particular, if the RP determines, based on the obtained PTP roles of the upstream switches, that the RP may not receive a PTP multicast packet via a native path, the RP can send the gratuitous register-stop message. Such a message can prevent a DR from continuously sending register messages for a multicast group associated with the PTP to the RP and ensure convergence of the multicast protocol in the network.

With existing technologies, PTP uses a multicast protocol, such as PIM, for distributing time packets from a GMC. A respective time packet can be a time packet indicating a time stamp generated by the GMC. Since the GMC can send the time packets periodically, the GMC can generate a packet stream that is distributed using the multicast protocol. The sequence of packets from the GMC can also be referred to as a PTP stream. When PTP is configured on a switch, the switch can be a TC switch that can forward a time packet or a BC switch that can synchronize the local clock based on the time packet. The BC switch can then generate another packet and forward the new packet based on the multicast protocol. Hence, the BC switch becomes the source for the time packets forwarded downstream. In other words, the packet from the GMC is absorbed and a new packet is generated at the BC switch.

PTP can use a predefined multicast address (e.g., 224.0.1.129) for distributing the time packets. However, if the predefined address is a non-reserved multicast address, the switches in the network need to forward the time packets based on the multicast protocol. Typically, when a multicast source becomes active, the source DR of the multicast protocol can send a register message (e.g., a PIM register packet) to the RP of the multicast group. The register message can include an encapsulated multicast packet and can be forwarded to the RP via a tunnel. The encapsulation can be based on the tunneling protocol, and the encapsulated packets can be unicast packets. The RP can send a join request toward the source (e.g., to the source DR) for receiving packets. When the RP receives a packet from the source via a native path, the RP can determine that the source-specific tree is established and issue a stop registration message to the DR.

However, if a BC is placed between the RP and DR, the BC would continue to absorb the native multicast time packets sent by the source (e.g., the GMC or another BC). As a result, the RP may continue to receive encapsulated packets, which are unicast packets, without receiving multicast time packets via the native path. Without receiving time packets via the native paths, the RP may not send the register-stop message to the DR. On the other hand, if an RP is deployed on a BC switch, the PTP instance of the switch may absorb (e.g., terminate forwarding) a multicast time packet before the multicast protocol instance (e.g., a PIM instance) can process the time packet. Consequently, the multicast protocol instances on the switches of the network may not converge. Running a multicast protocol without convergence may lead to instability in the network.

To solve this problem, the discovery message used for multicast neighbor discovery can include the PTP role of the switch or an upstream switch. If the multicast protocol used by PTP is PIM, the discovery message can include a multicast control message, such as a PIM hello message. The PTP role can indicate whether the switch is a TC or BC switch. If the switch is neither, the PTP role can also indicate whether an upstream switch is a BC switch (e.g., discovered based on the discovery message from an upstream switch). Based on the exchange of discovery messages, an RP can discover the presence of a BC switch in the upstream path to the source DR.

During operation, the RP of the multicast group associated with PTP can receive a register message. The register message can be for the multicast group and can encapsulate a time packet of a PTP stream from the DR. The RP can then determine whether the local switch or an upstream switch is a BC switch. If the local or upstream switch is a BC switch, the BC switch can absorb the packet and issue a new time packet as a source. Consequently, the RP can determine that, upon sending a join request for the multicast group, the RP may not receive time packets via the native path. The RP can then proactively send a gratuitous register-stop message toward the DR, which can cause the DR to stop sending register messages to the RP. If the RP also operates as a BC switch, the RP can receive a time packet from an upstream BC switch and synchronize its local clock accordingly.

Instead of a BC switch, if the upstream neighbor is a TC switch, the RP may not send a gratuitous register-stop message because the TC switch can forward the multicast PTP stream toward downstream switches. Consequently, the RP can receive the multicast PTP stream via the native path and send a register-stop message. If there are equal-cost multiple paths (ECMP) available between the RP and the source DR, the RP can check for the presence of a BC switch on each of the paths. If one of the paths does not have a BC switch, the source DR and the RP can select that path for exchanging register messages, register-stop messages, and the PTP stream. Such a selection can ensure that both the multicast protocol and PTP can operate without additional intervention.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "message" refers to a group of bits that can be transported together across a network. "Message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a network that provides fast convergence to a multicast protocol facilitating time synchronization, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other network, and may use a corresponding communication protocol, such as Internet Protocol (IP), FibreChannel over Ethernet (FCOE), or other protocol. Network 100 can include a number of switches 112, 114, 122, 124, 132, 134, and 136. Network 100 can use PTP for time synchronization. To deploy PTP, network 100 can include GMCs 102 and 104. Here, GMC 102 can be an active clock while GMC 104 can be a standby clock for GMC 102. If GMC 102 becomes unavailable, GMC 104 can start sending a PTP stream.

Network 100 can also include ordinary clocks (OCs) 142 and 144. OC 142 and 144 can exist at the edge of network 100 and operate as the termination point for PTP streams from GMCs 102 and 104, respectively. OC 142 can maintain a single upstream interface via which OC 142 can synchronize the local clock with GMC 102 without operating as a time source. With existing technologies, GMC 101 can use a multicast protocol, such as PIM, for distributing streams of time packets in network 100. In this example, switches 112 and 114 can be TC switches, and switches 122 and 124 can be BC switches. As a result, when switch 112 receives a time packet from GMC 102, switch 112 can forward the time packet to downstream switch 122.

Upon receiving the time packet, switch 122 can synchronize the local clock based on the time packet. Switch 122 can then generate another packet and forward the new packet based on the multicast protocol to downstream switch 132. Hence, being a BC switch, switch 122 can become the source for the time packets forwarded to switch 132. In other words, the packet from GMC 102 can be absorbed and a new packet is generated at switch 122. To distribute time packets in network 100, GMC 102, and switches 112 and 122 can use a predefined multicast address (e.g., 224.0.1.129). However, if the predefined address is a non-reserved multicast address for PIM, the switches in network 100 need to forward the time packets based on the multicast protocol.

Suppose that TC switch 112 (or switch 114) is configured as an RP for the multicast group associated with PTP in network 100. A PTP stream from GMC 102 can be forwarded by TC switch 112 to BC switch 122. BC switch 122 can absorb the PTP stream and initiate a new PTP stream. Accordingly, an interface on BC switch 122 can then operate as a DR interface for the PTP stream generated from BC switch 122. Under such circumstances, the DR interface can be a downstream interface, and hence, the PTP stream can be sent only to the downstream switches (e.g., to switch 132). Because the PTP streams are managed by the PTP instances on the switches of network 100, the multicast instances on these switches may not be aware of the PTP streams. Since the RP is configured on TC switch 112, the RP can expect the PTP stream from BC switch 122. However, since the PTP stream from BC switch 122 may not be forwarded to TC switch 112, the registration process for the multicast process may remain incomplete.

In another example, switch 132 (or switch 134) can be configured as an RP for the multicast group associated with PTP in network 100. Under such circumstances, TC switch 112 can operate as the DR for the PTP stream from GMC 102. Switch 112 can then encapsulate the time packets of the PTP stream and send the encapsulated PTP stream to switch 132 as unicast register messages. In response, switch 132 can send a join request to TC switch 112. The PTP stream from GMC 102 can be forwarded by TC switch 112 to BC switch 122. BC switch 122 can absorb the PTP stream and initiate a new PTP stream. As a result, switch 132, as the RP, may continue to receive the encapsulated PTP stream without receiving the PTP stream through the native path (e.g., via switches 112 and 122).

BC switch 122 (or switch 124) can also be configured as an RP for the multicast group associated with PTP. Under such circumstances, TC switch 112 can operate as the DR for the PTP stream from GMC 102. A PTP stream from GMC 102 can then be forwarded by TC switch 112 to switch 122. However, such a configuration may also lead to incomplete registration because the PTP stream forwarded by switch 112 to switch 122 can be natively received and processed by the PTP instance on switch 122. As a result, the RP instance on switch 122 may not receive the PTP stream from GMC 102. Therefore, regardless of how an RP is deployed in network 100, the transmission of the encapsulated PTP stream via register messages can cause unnecessary utilization of processing and bandwidth resources of network 100.

To solve this problem, a respective switch in network 100 can share its PTP role using the discovery message used for multicast neighbor discovery. If the multicast protocol used by PTP is PIM, the discovery message can include a PIM hello message. Switch 112 can determine its PTP role as a TC and send a discovery message 152 to downstream switch 122. A predetermined field of message 152 can include a predetermined value indicating the PTP role as a TC. Upon receiving message 152, switch 122 can determine that the PTP role of upstream switch 112 is a TC. Similarly, switch 122 can determine its PTP role as a BC and send a discovery message 154 to downstream switch 132. Based on message 154, switch 132 can determine that the PTP role of upstream switch 122 is a BC.

In the same way, switch 114 can send a discovery message 156 to downstream switch 124 indicating that switch 114 is a TC switch, and switch 124 can send a discovery message 158 to downstream switch 134 indicating that switch 124 is a BC switch. In this example, switch 134 is not configured as a TC or BC. Accordingly, when switch 134 sends a discovery message 160 to downstream switch 136, message 160 can indicate that an upstream switch, which is switch 124, is a BC switch. Here, switch 134 can discover the PTP role of switch 124 based on message 158 from switch 124. Based on the exchange of discovery messages, an RP can discover the presence of a BC switch in the upstream path regardless of the location of the RP.

Regardless of where an RP is placed in network 100, when the RP receives a new register message, the RP can use the information obtained from the discovery messages. The multicast protocol instance (e.g., the PIM instance) running on a multicast daemon of a switch can facilitate the operations of the RP. The RP can perform a unicast route lookup to find out the upstream path toward the source (e.g., the source DR). Based on the unicast route lookup result, the RP can send a source-specific join request (e.g., a PIM join request) to the source DR. If the RP is deployed on TC switch 112 or downstream switch 132, the RP can determine the upstream multicast neighbor (e.g., PIM-enabled switches or routers) on the path to the source DR.

For example, if the RP is deployed on switch 132, the source DR can be switch 112 and the upstream neighbor switch can be switch 122. The RP can then determine whether switch 122 or its upstream switch is a BC switch. Since switch 122 is a BC switch, the RP on switch 132 can determine that the multicast PTP stream from the source (e.g., GMC 102) may not arrive at switch 132 after sending the join request to the source. To address this issue, switch 132 can send a gratuitous register-stop message 164 toward the source DR (e.g., switch 112). Upon receiving register-stop message 164, the DR on switch 112 can stop sending register messages (e.g., encapsulated PTP stream) to switch 132.

On the other hand, if the RP is deployed on switch 112, the source DR interface can be on BC switch 122. The upstream switch toward the source DR can then be switch 122. The RP on switch 112 can then determine whether switch 122 or its upstream switch is a BC switch. Since switch 122 is a BC switch, the RP on switch 112 can determine that the multicast PTP stream from the source (e.g., BC switch 122) may not arrive at switch 112 after sending the join request to the source. To address this issue, switch 112 can send a gratuitous register-stop message 162 toward the source DR (e.g., switch 122). Upon receiving register-stop message 162, the DR on switch 122 can stop sending register messages (e.g., encapsulated PTP stream) to switch 112. In this way, if the RP is deployed on switch 112 or 132, the RP can complete the multicast registration sequence and avoid encapsulation of PTP streams to the RP.

The RP can also be deployed on BC switch 122. The RP can determine that the PTP instance on switch 122 may receive and process the multicast PTP stream from the source (e.g., GMC 102) before the RP can obtain the PTP stream. To address this issue, the RP can send a gratuitous register-stop message 166 toward the source DR (e.g., switch 112). Upon receiving register-stop message 166, the DR on switch 112 can stop sending register messages (e.g., encapsulated PTP stream) to switch 122. Furthermore, the encapsulated PTP stream received via register messages is not forwarded toward the downstream interfaces of switch 122 to ensure that the PTP functionality is dictated by the PTP.

In network 100, the RP may not send a gratuitous register-stop message if there is no BC switch in the upstream path. In particular, the presence of a TC switch may not interrupt the flow of the multicast PTP stream because the TC switch can forward the PTP stream toward downstream switches. Consequently, the RP can receive the multicast PTP stream via the native path and send a register-stop message. If there are ECMP available between the RP and the source DR in network 100, the RP can check for the presence of a BC switch on each of the paths. If one of the paths does not have a BC switch, the source DR and the RP can select that path for exchanging register messages, register-stop messages, and the PTP stream. Such a selection can ensure that both the multicast protocol and PTP can operate without additional intervention.

Figure 2:
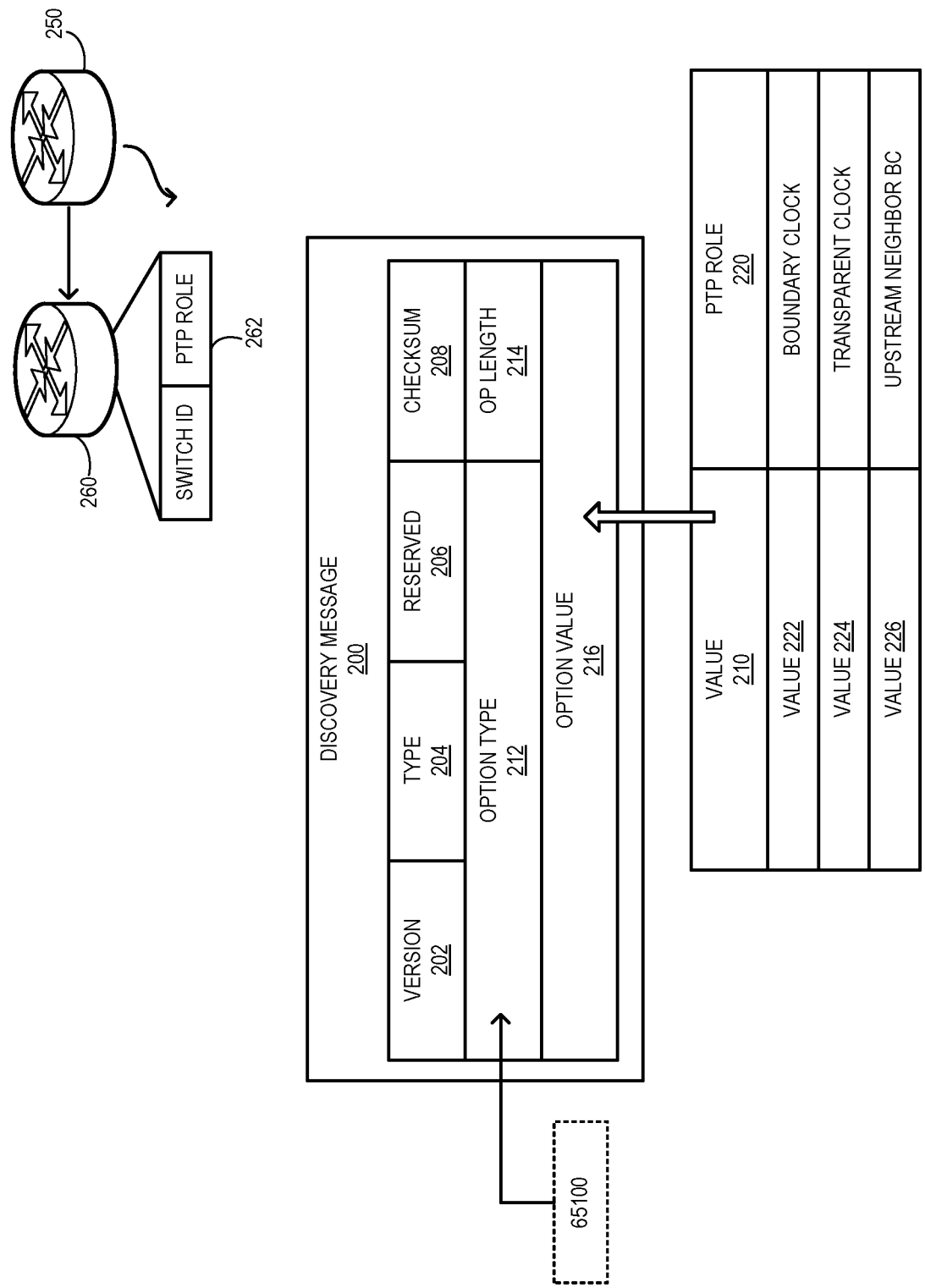
FIG. 2 illustrates an example of a multicast control message for notifying the local Precision Time Protocol (PTP) role, in accordance with an aspect of the present application.

To ensure the discovery of the PTP roles, PTP roles can be exchanged and learned across network 100. FIG. 2 illustrates an example of a multicast control message for notifying the local PTP role, in accordance with an aspect of the present application. A discovery message 200 can be used to publish the PTP roles. A switch receiving message 200 can learn the PTP role of the neighbor switch. Discovery message 200 can be a multicast control message, such as a PIM hello message used for discovering PIM neighbors. Message 200 can then include a version field 202, a type field 204, a reserved field 206, a checksum field 208, an option type field 212, an option length field 214, and an option value field 216. Fields 202 and 204 can indicate the version and type of the underlying discovery protocol. Option type field 212 can be used to build and communicate the PTP roles.

If discovery message 200 is a PIM Hello message, version field 202 can indicate the version of the PIM deployment, and type field 204 can indicate the type of PIM deployment. A range of values between 65001 and 65535 can be reserved by the PIM sparse mode (SM) protocol for customized use in a PIM Hello message. Option type field 212 can include a predetermined value, such as 65100, that can indicate the presence of a PTP role in message 200. Option value 216 can then include a predetermined value 210 that can indicate the corresponding PTP role 220. Option length 214 can indicate the length of option value 216.

A switch 250 that supports the exchange of discovery messages can include a predetermined value indicating the PTP role of the local switch in option value 216. To indicate switch 250 as a BC switch or a TC switch, option value 216 can include predetermined values 222 and 224, respectively. If switch 250 is neither, switch 250 can also include a predetermined value 226 that indicates that an upstream switch of switch 250 is a BC switch. In other words, value 226 can indicate that switch 250 has detected a BC switch in the path to reach the RP. In an example, predetermined values 222, 224, and 226 can include values of 0x01, 0x02, and 0x03, respectively.

When another switch 260 receives message 200, switch 260 can process different options indicated in message 200. For example, switch 260 can determine the PTP role indicated in message 200 from option value 216. Switch 260 can then store the PTP role and an identifier of the corresponding switch in discovery data structure 262. If switch 250 is a BC switch or a TC switch, data structure 262 can include an identifier of switch 250 (e.g., an IP address of switch 250) and the corresponding value (e.g., value 222 or 224) that indicates the PTP role of switch 250. In addition, data structure 262 can also indicate whether an upstream switch of switch 250 is a BC switch. On the other hand, if option type field 212 does not include the value of "65100" or a different value, switch 260 can determine that PTP is disabled at switch 250. In this way, switch 260 can become aware of the PTP roles in the network.

Figure 3:
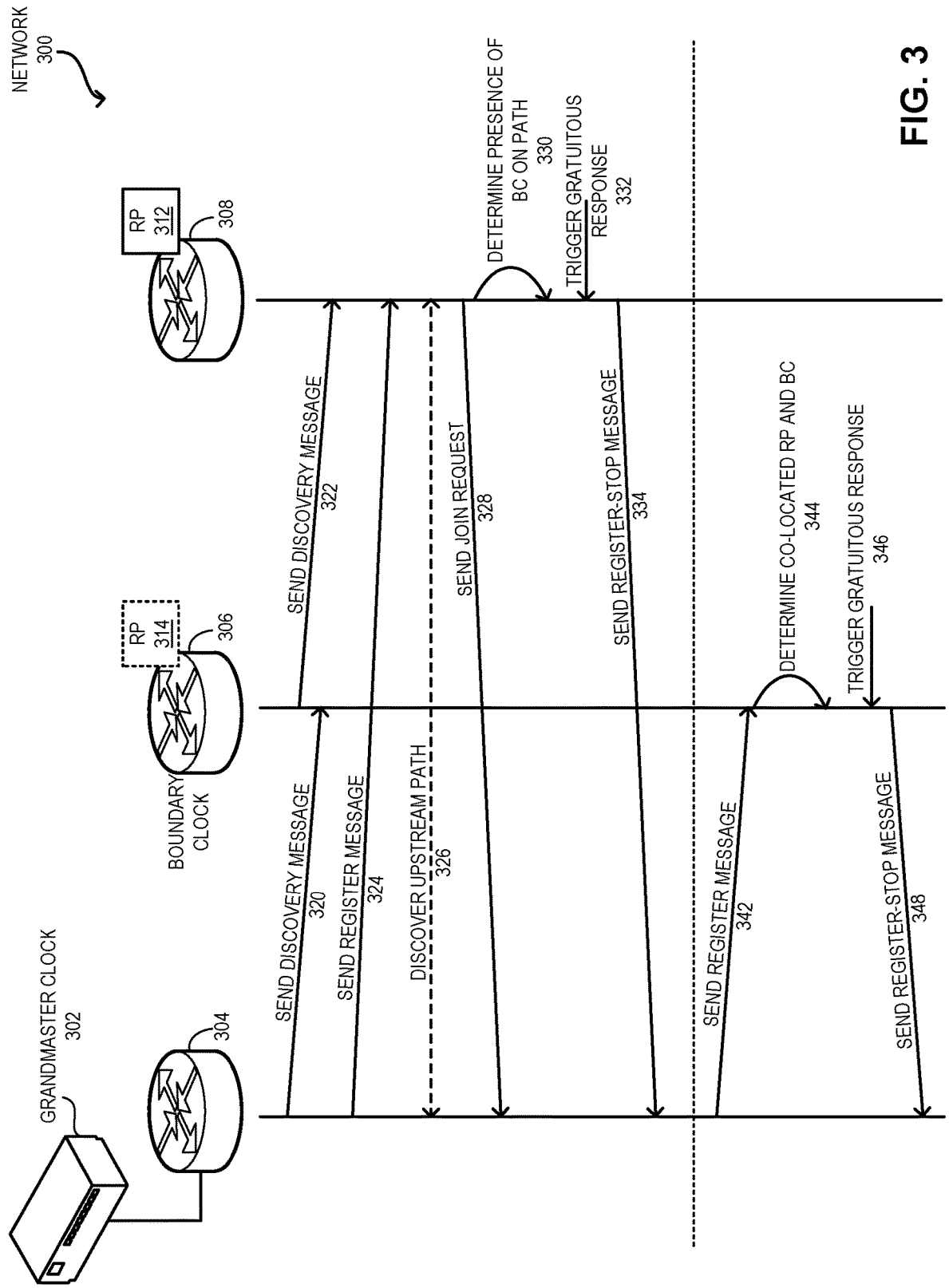
FIG. 3 illustrates examples of communications that provide fast convergence to a multicast protocol facilitating time synchronization in a network, in accordance with an aspect of the present application.

FIG. 3 illustrates examples of communications that provide fast convergence to a multicast protocol facilitating time synchronization in a network, in accordance with an aspect of the present application. A network 300 can include a plurality of switches 304, 306, and 308. Switch 304 can be coupled to GMC 302. Hence, switch 304 can be the source DR for a PTP stream from GMC 302. Suppose that an RP 312 is deployed on switch 308. Switch 306 can be configured as a BC switch. During operation, switch 304 can send a discovery message to its downstream switch 306 (operation 320).

Similarly, switch 306 can send a discovery message to its downstream switch 308 (operation 322). Here, the discovery message from switch 306 can indicate whether switch 306 is associated with a role of TC or BC, or whether switch 304 is associated with a role of BC. Switch 304 can encapsulate a time packet from GMC 302 and send the register message to switch 308 (operation 324). RP 312 can then perform a unicast route lookup to find out the upstream path toward GMC 302 (e.g., switch 304) (operation 326). Based on the unicast route lookup result, RP 312 can send a source-specific join request (e.g., a PIM join request) to switch 304 (operation 328).

RP 312 can determine that switch 306 is on the path to switch 304 and determine that switch 306 is a BC switch. In this way, RP 312 can determine the presence of a BC switch on the upstream path (operation 330). Since switch 306 is a BC switch, RP 312 can determine that the multicast PTP stream from GMC 302 may not arrive at switch 308, which can then trigger a gratuitous response for the register message (operation 332). RP 312 can then send a gratuitous register-stop message toward switch 304 (operation 334). Upon receiving the register-stop message, switch 304 can stop sending register messages (e.g., encapsulated PTP stream) to RP 312.

On the other hand, an RP 314 can also be deployed on switch 306 (denoted with dotted lines). Switch 304 can then send a register message to RP 314 on switch 306 (operation 342). RP 314 can then determine that RP 314 is co-located with a BC switch (operation 344). Hence, RP 314 can determine that the PTP instance on switch 306 may receive and process the multicast PTP stream from switch 304 before RP 314 can obtain the PTP stream. This determination can trigger a gratuitous response for the register message (operation 346). RP 314 can then send a gratuitous register-stop message toward switch 304. In the same way, upon receiving the register-stop message, switch 304 can stop sending register messages (e.g., encapsulated PTP stream) to RP 314.

Figure 4A:
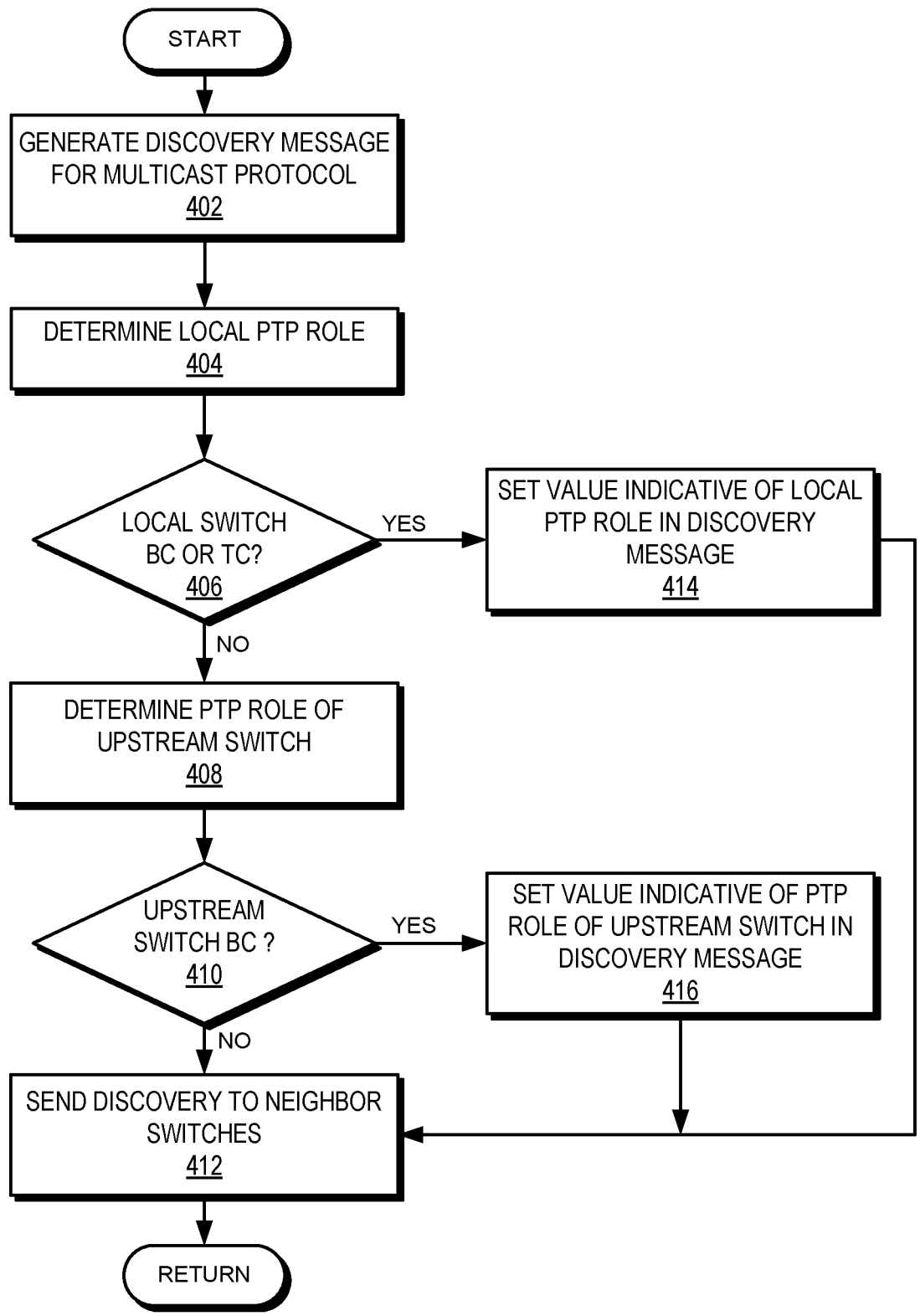
FIG. 4A presents a flowchart illustrating the process of a switch notifying the local PTP role to a Rendezvous Point (RP), in accordance with an aspect of the present application.

FIG. 4A presents a flowchart illustrating the process of a switch notifying the local PTP role to an RP, in accordance with an aspect of the present application. During operation, the switch can generate a discovery message for the multicast protocol (operation 402) and determine the local PTP role (operation 404). The switch can determine whether the local switch is a BC or TC switch (operation 406). If the local switch is not a BC or TC switch, the switch can determine the PTP role of an upstream switch (operation 408) and determine whether the upstream switch is a BC switch (operation 410).

If the local switch is a BC or TC switch, the switch can set a value indicative of the local PTP role in the discovery message (operation 414). On the other hand, if the upstream switch is a BC switch, the switch can set a value indicative of the PTP role of the upstream switch in the discovery message (operation 416). Upon setting the value in the discovery message, the switch can send the discovery message to the neighbor switches (operation 412). A neighbor switch can be a multicast-enabled switch (e.g., a PIM router) reachable from the switch.

Figure 4B:
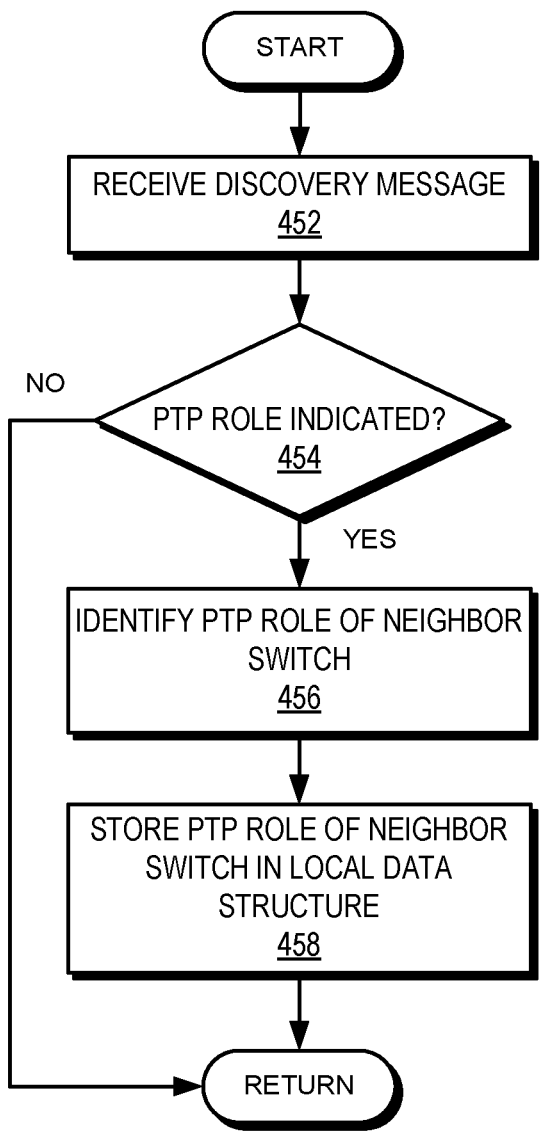
FIG. 4B presents a flowchart illustrating the process of a switch operating as an RP determining the PTP role of a neighbor switch, in accordance with an aspect of the present application.

FIG. 4B presents a flowchart illustrating the process of a switch operating as an RP determining the PTP role of a neighbor switch, in accordance with an aspect of the present application. During operation, the switch can receive a discovery message (operation 452) and determine whether a PTP role is indicated in the discovery message (e.g., based on a predetermined options value) (operation 454). If a PTP role is indicated, the switch can identify the PTP role of the neighbor switch (operation 456) and store the PTP role of the neighbor switch in a local data structure (operation 458). For example, the PTP role can be stored in association with an identifier of the neighbor switch.

Figure 5:
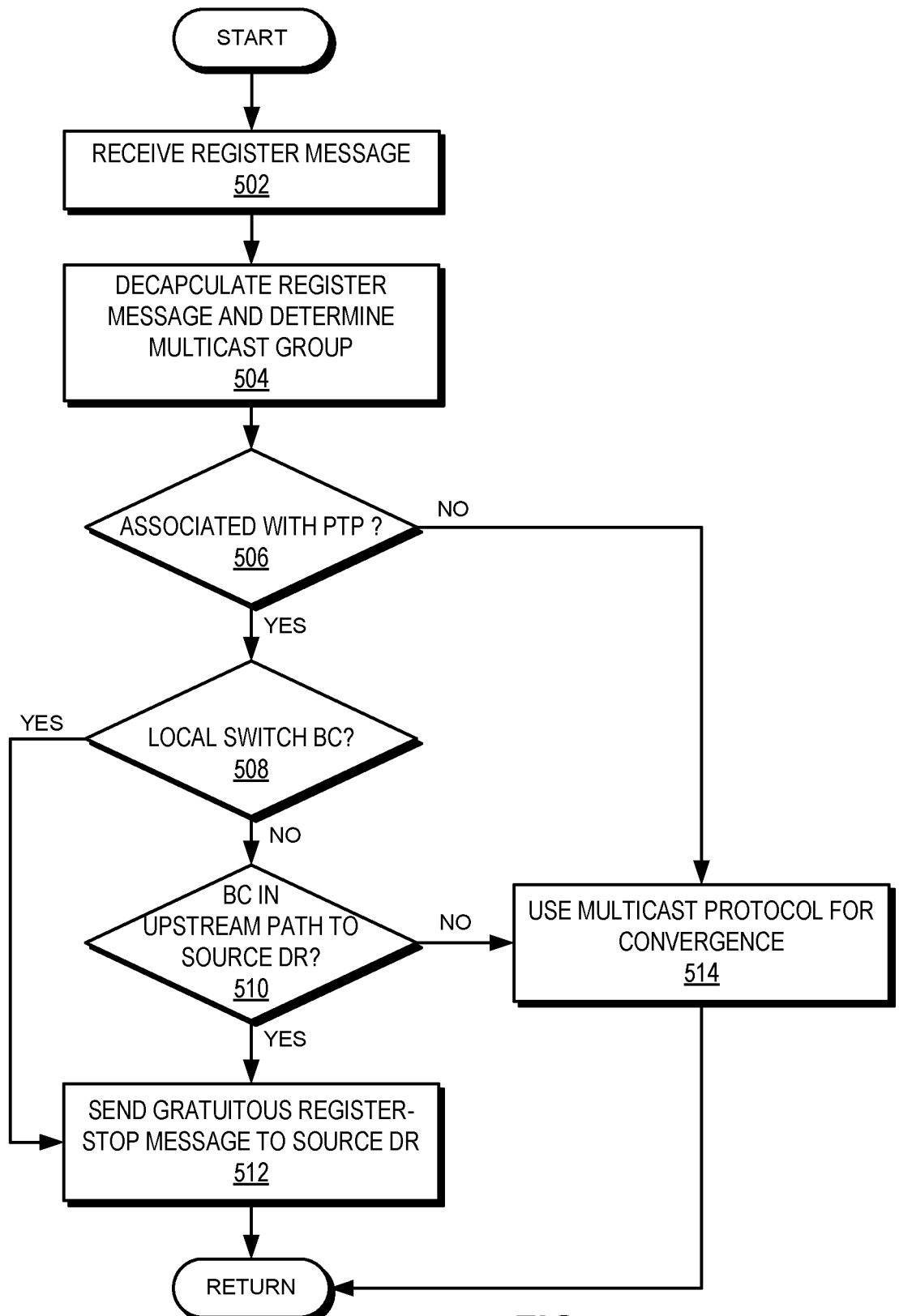
FIG. 5 presents a flowchart illustrating the process of a switch operating as an RP providing fast convergence to a multicast protocol that facilitates time synchronization in a network, in accordance with an aspect of the present application.

FIG. 5 presents a flowchart illustrating the process of a switch operating as an RP providing fast convergence to a multicast protocol that facilitates time synchronization in a network, in accordance with an aspect of the present application. During operation, the switch can receive a register message (operation 502). The switch can then decapsulate the register message and determine the multicast group (operation 504). The switch can determine whether the multicast group is associated with PTP (e.g., for multicast address 224.0.1.129) (operation 508). If the multicast group is associated with PTP, the switch can determine whether the local switch is a BC switch (operation 508).

If the local switch is not a BC switch, the switch can also determine whether a BC switch is in the upstream path to the source DR (operation 508). If the local switch is a BC switch (operation 508) or a BC switch is in the upstream path to the source DR (operation 510), the switch can send a gratuitous register-stop message to the source DR (operation 512). On the other hand, if the multicast group is not associated with PTP (operation 506) or a BC switch is not in the upstream path to the source DR (operation 510), the switch can use multicast protocol (e.g., use the standard PIM protocol) for convergence (operation 514).

Figure 6:
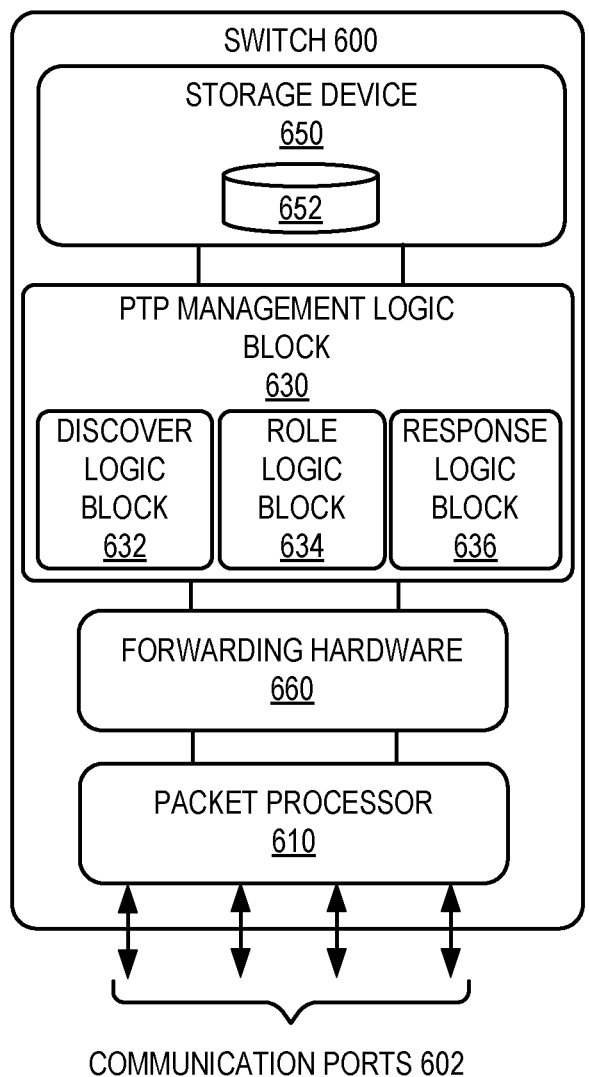
FIG. 6 illustrates an example of a switch that provides fast convergence to a multicast protocol facilitating time synchronization in a network, in accordance with an aspect of the present application.

FIG. 6 illustrates an example of a switch that provides fast convergence to a multicast protocol facilitating time synchronization in a network, in accordance with an aspect of the present application. In this example, a switch 600 can include a number of communication ports 602, a packet processor 610, and a storage device 650. Switch 600 can also include forwarding hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a PTP management logic block 630 that can allow switch 600 to facilitate fast convergence. PTP management logic block 630 can include a discover logic block 632, a role logic block 634, and a response logic block 636.

Discover logic block 632 can send a discovery message indicating the PTP role of the local switch or an upstream switch to neighbor switches. Role logic block 634 can determine the PTP role of a neighbor switch or its upstream switch based on a discovery message from the neighbor switch. Role logic block 634 can also store the PTP role in association with an identifier of the corresponding switch. Furthermore, response logic block 636 can determine whether the upstream path to the source DR includes a BC switch upon receiving a register message. If a BC switch is in the upstream path to the source DR, response logic block 636 can send a gratuitous register-stop message to the source DR.

One aspect of the present technology can provide a system for providing fast multicast convergence for Precision Time Protocol (PTP) at a switch. During operation, the system can receive a multicast control message based on a multicast protocol used for PTP from a respective neighbor switch coupled to the switch. The multicast control message can indicate neighbor information associated with the multicast protocol. The system can then determine a role associated with the PTP for a remote switch from the control message. Upon receiving a register message for a multicast group associated with the PTP, the system can determine whether a multicast path from the switch to a PTP source includes a device with a role of a boundary clock (BC) of PTP. The BC can provide a time reference for synchronizing a local clock of the switch using PTP. If the multicast path includes a device with a role of a BC, the system can proactively send a gratuitous register-stop message for the multicast group toward the PTP source in absence of a native path to the PTP source.

In a variation on this aspect, the remote switch can be an upstream switch of the switch or a second upstream switch of the upstream switch.

In a variation on this aspect, the device includes the switch. The switch can then be configured to operate as a rendezvous point (RP) of the multicast group.

In a further variation, the system can receive a first packet for the multicast group from the PTP source. The first packet can then be absorbed by a PTP instance of the switch prior to a multicast instance of the switch processing the first packet.

In a further variation, the system can generate a second packet with the switch as a second PTP source. The second packet can be destined to the multicast group.

In a variation on this aspect, if the multicast path excludes a device with a role of a BC, the system can receive a packet for the multicast group via the native path from the PTP source and send a register-stop message toward the PTP source in accordance with the multicast protocol.

In a variation on this aspect, the system can determine equal-cost multiple paths (ECMP) to the PTP source and determine whether a path in the ECMP excludes a device with a role of a BC. Upon determining a path that excludes a device with a role of a BC, the system can select the path for receiving packets for the multicast group.

In a variation on this aspect, the multicast protocol can include Protocol-Independent Multicast (PIM). The multicast control message can then include a PIM Hello message.

In a variation on this aspect, the multicast control message can include a first value indicating a notification of the role associated with the PTP and a second value indicating the role.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
receiving, by a switch, a multicast control message based on a multicast protocol used for Precision Time Protocol (PTP) from a respective neighbor switch coupled to the switch, wherein the multicast control message indicates neighbor information associated with the multicast protocol;
determining, by the switch, a role associated with the PTP for a remote switch from the control message;
in response to receiving a register message for a multicast group associated with the PTP, determining whether a multicast path from the switch to a PTP source includes a device with a role of a boundary clock (BC) of PTP, wherein the BC provides a time reference for synchronizing a local clock of the switch using PTP; and
in response to the multicast path including a device with a role of a BC, proactively, in absence of a native path to the PTP source, sending a gratuitous register-stop message for the multicast group toward the PTP source.

2. The method of claim 1, wherein the remote switch is an upstream switch of the switch or a second upstream switch of the upstream switch.

3. The method of claim 1, wherein the device includes the switch, and wherein the switch is configured to operate as a rendezvous point (RP) of the multicast group.

4. The method of claim 3, further comprising:
receiving a first packet for the multicast group from the PTP source; and
absorbing the first packet by a PTP instance of the switch prior to a multicast instance of the switch processing the first packet.

5. The method of claim 4, further comprising generating a second packet with the switch as a second PTP source, wherein the second packet is destined to the multicast group.

6. The method of claim 1, wherein, in response to the multicast path excluding a device with a role of a BC, the method further comprises:
receiving a packet for the multicast group via the native path from the PTP source; and
sending a register-stop message toward the PTP source in accordance with the multicast protocol.

7. The method of claim 1, further comprising:
determining equal-cost multiple paths (ECMP) to the PTP source;
determining whether a path in the ECMP excludes a device with a role of a BC; and
in response to determining a path that excludes a device with a role of a BC, selecting the path for receiving packets for the multicast group.

8. The method of claim 1, wherein the multicast protocol includes Protocol-Independent Multicast (PIM), and wherein the multicast control message includes a PIM Hello message.

9. The method of claim 1, wherein the multicast control message includes a first value indicating a notification of the role associated with the PTP and a second value indicating the role.

10. A non-transitory computer-readable storage medium storing instructions that when executed by a computer cause the computer to perform a method, the method comprising:
receiving, at a switch, a multicast control message based on a multicast protocol used for Precision Time Protocol (PTP) from a respective neighbor switch coupled to the switch, wherein the multicast control message indicates neighbor information associated with the multicast protocol;
determining a role associated with the PTP for a remote switch from the control message;
in response to receiving a register message for a multicast group associated with the PTP, determining whether a multicast path from the switch to a PTP source includes a device with a role of a boundary clock (BC) of PTP, wherein the BC provides a time reference for synchronizing a local clock of the switch using PTP; and
in response to the multicast path including a device with a role of a BC, proactively, in absence of a native path to the PTP source, sending a gratuitous register-stop message for the multicast group toward the PTP source.

11. The non-transitory computer-readable storage medium of claim 10, wherein the remote switch is an upstream switch of the switch or a second upstream switch of the upstream switch.

12. The non-transitory computer-readable storage medium of claim 10, wherein the device includes the switch, and wherein the switch is configured to operate as a rendezvous point (RP) of the multicast group.

13. The non-transitory computer-readable storage medium of claim 12, wherein the method further comprises:
   receiving a first packet for the multicast group from the PTP source; and
   absorbing the first packet by a PTP instance of the switch prior to a multicast instance of the switch processing the first packet.

14. The non-transitory computer-readable storage medium of claim 13, wherein the method further comprises generating a second packet with the switch as a second PTP source, wherein the second packet is destined to the multicast group.

15. The non-transitory computer-readable storage medium of claim 10, wherein, in response to the multicast path excluding a device with a role of a BC, the method further comprises:
   receiving a packet for the multicast group via the native path from the PTP source; and
   sending a register-stop message toward the PTP source in accordance with the multicast protocol.

16. The non-transitory computer-readable storage medium of claim 10, wherein the method further comprises:
   determining equal-cost multiple paths (ECMP) to the PTP source;
   determining whether a path in the ECMP excludes a device with a role of a BC; and
   in response to determining a path that excludes a device with a role of a BC, selecting the path for receiving packets for the multicast group.

17. The non-transitory computer-readable storage medium of claim 10, wherein the multicast protocol includes Protocol-Independent Multicast (PIM), and wherein the multicast control message includes a PIM Hello message.

18. The non-transitory computer-readable storage medium of claim 10, wherein the multicast control message includes a first value indicating a notification of the role associated with the PTP and a second value indicating the role.

19. A computer system, comprising:
   a processor;
   a memory device;
   a discover logic block to receive a multicast control message based on a multicast protocol used for Precision Time Protocol (PTP) from a respective neighbor computer system coupled to the computer system, wherein the multicast control message indicates neighbor information associated with the multicast protocol;
   a role logic block to determine a role associated with the PTP for a remote computer system from the control message; and
   a response logic block to:
      in response to receiving a register message for a multicast group associated with the PTP, determining whether a multicast path from the computer system to a PTP source includes a device with a role of a boundary clock (BC) of PTP, wherein the BC provides a time reference for synchronizing a local clock of the computer system using PTP; and
      in response to the multicast path including a device with a role of a BC, proactively, in absence of a native path to the PTP source, sending a gratuitous 17 register-stop message for the multicast group toward the PTP source.

20. The computer system of claim 19, wherein the device includes the switch, wherein the switch is configured to operate as a rendezvous point (RP) the multicast group; and wherein the computer system further comprises a PTP management logic block to:
   receive a first packet for the multicast group from the PTP source; and
   absorb the first packet prior to a local multicast instance processing the first packet.

* * * * *